No. 857,184. PATENTED JUNE 18, 1907.
R. LUNDELL.
DYNAMO ELECTRIC MACHINE OR ELECTRIC MOTOR.
APPLICATION FILED JAN. 11, 1906.
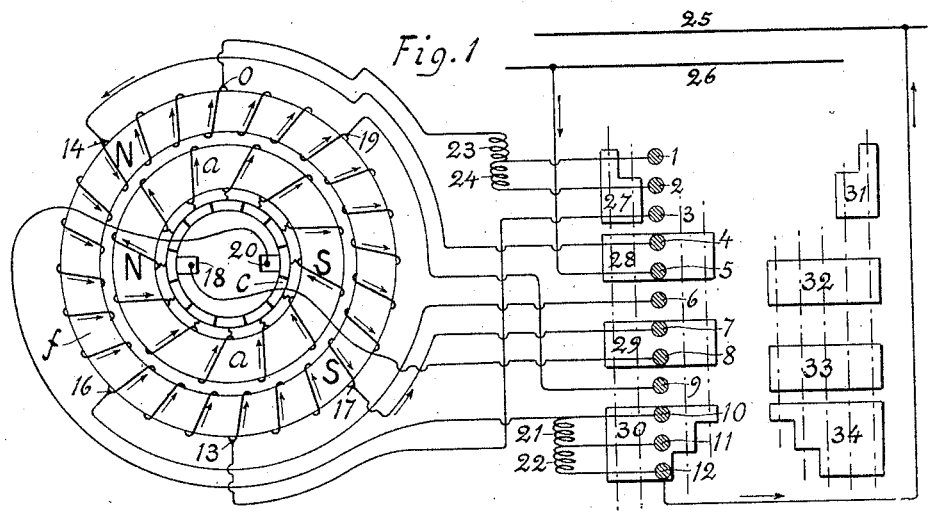
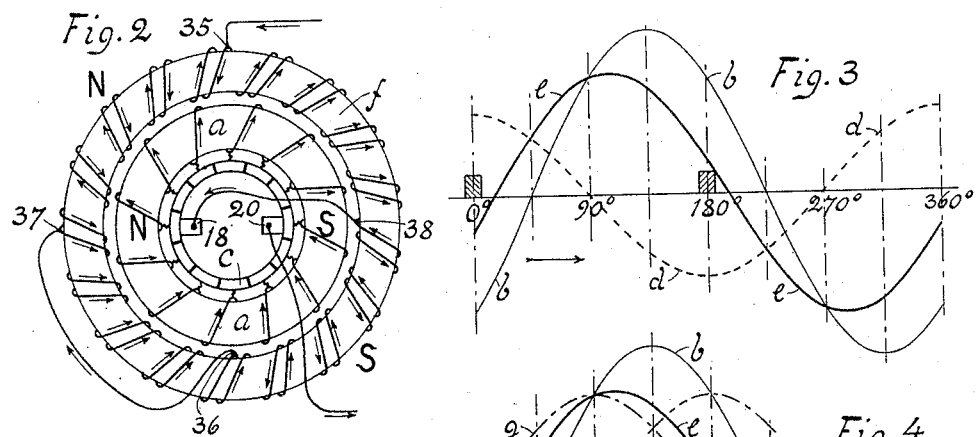
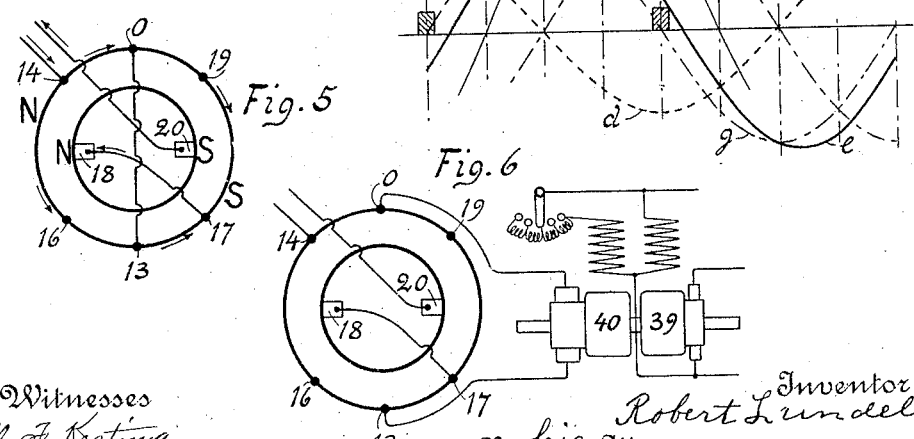
Witnesses
M. F. Keating
M. H. Nicholas
Inventor
Robert Lundell,
By his Attorney
Charles J. Kintner

UNITED STATES PATENT OFFICE.

ROBERT LUNDELL, OF NEW YORK, N. Y.

DYNAMO-ELECTRIC MACHINE OR ELECTRIC MOTOR.

No. 857,184.  Specification of Letters Patent.  Patented June 18, 1907.

Application filed January 11, 1906. Serial No. 295,597.

*To all whom it may concern:*

Be it known that I, ROBERT LUNDELL, a citizen of the United States, residing in New York, borough of Manhattan, county and State of New York, have made a new and useful Invention in Dynamo-Electric Machines or Electric Motors, of which the following is a specification.

The present improvement relates to the types of dynamos or motors which are provided with means for neutralizing or overcoming the armature reaction; that is, the cross magnetizing effect of the armature-field, which is at 90 electrical degrees to the field proper, and it relates in particular to the field regulation and the commutation of machines which are provided with "distributed" field windings.

The invention has for its main objects: First, the construction and proper proportion of a simple and efficient form of series field winding which will serve the three-fold purpose of, (a) a winding for excitation capable of regulation, (b) a winding which will compensate for armature reaction, and (c) a winding which will produce commutating polarities (a commutation-field) of a predetermined strength sufficient to properly reverse the currents in the commutated armature coils without sparking at the brushes. Second, the combination of a field winding having the above characteristics with means for shifting the magnetizing effect of the said field winding in such a manner that the brushes may remain stationary when the direction of rotation is reversed. Third, the construction of simple means for varying the excitation strength of a field winding having the above-mentioned characteristics. Fourth, a general improvement in the operating qualities and a reduction of the size, weight and cost of machines constructed according to the principles of the present invention.

It is well known in the art that a "distributed" field winding for direct current machines will cause additional difficulties in regard to commutation, chiefly because the polar arc extends the entire 180 electrical degrees and because the small air-gap in the "neutral" zone will increase the inductive voltage in the commutated armature coils. It becomes necessary, in order to secure perfect commutation, not only to compensate for the armature reaction, but also to produce a positive commutating field which will properly reverse the currents in the coils short-circuited by the brushes.

Referring now to the drawings, Figure 1 is a diagram of a reversible motor with a controller, constructed according to the principles of the present invention. Fig. 2 is a diagram of another motor furnished with two field windings which produce results similar to the simple field winding shown in Fig. 1. The main reason for illustrating the motor shown in Fig. 2 is to make the advantages of the arrangement shown in Fig. 1 fully understood by a comparison between the two. Figs. 3 and 4 are graphic induction diagrams (field diagrams) pertaining to Figs. 1 and 2 respectively. Fig. 5 is another diagrammatic illustration of the field—and the armature—windings of Fig. 1 and serves to illustrate the manner in which the field polarities are shifted when the excitation component of the said field winding is reduced to a minimum. Fig. 6 is a similar diagrammatic illustration of the field—and the armature—windings of Fig. 1 and shows the manner in which the excitation component of the said field winding may be varied by admitting a separate current of excitation in addition to the main current.

Referring now to Fig. 1 in detail, $a$ represents the armature, $c$ the commutator, and $f$ the field magnet of a bi-polar motor. Both the armature and the field magnet are for convenience of illustration supplied with "Gramme ring" windings and it should be understood that the well known drum windings (wound in slots) would be preferable in a working machine. 1 to 12 inclusive represent the stationary contacts of a controller and 27 to 34 inclusive represent the movable contacts of the said controller. 25 and 26 represent the supply wires. 21 and 22 represent suitable starting and speed regulating resistances. 23 and 24 represent other resistances which are arranged to reduce the strength of the excitation component of the field winding at the higher speeds. 0, 13; 14, 17; 16, 19 represent terminals or leads of the field winding, said terminals being respectively connected to the stationary controller contacts 1, 3; 4, 7; 6, 9; as shown. 18 and 20 represent the brushes for the commutator $c$.

The operation of this motor will best be understood by following the currents as they flow through the various circuits of the apparatus at any fixed position of the controller— position No. 3 being shown on the drawing (Fig. 1). Starting then at the supply wire 26, the current flows in the direction of the arrow to the controller contacts 5, 28 and 4, then to the field terminal 14, where it divides itself in the two-circuit field winding as clearly shown by the arrows, leaving the field winding at terminal 17 and producing the polarities N, S, as indicated. (It will be noticed that all the other field terminals are disconnected at the controller.) From the field terminal 17 the current flows to other controller contacts 7, 29 and 8, then to brush 18, where it again divides itself in the two-circuit armature winding, as indicated by the arrows, producing the armature polarities N, S, and leaving the armature circuit by the other brush 20. From this point the current flows by way of other controller contacts 10, 30 and 12 to the other supply wire 25, the starting resistances being short circuited in this position of the controller, as clearly shown on the drawing. It will be seen from inspection of the controller contacts that the field terminals 0 and 13 become connected through the resistances 23 and 24 at the 4th position of the controller. At the 5th position the resistance 23 is alone included in the outside circuit between the above-mentioned field terminals. These terminals are located at 90 electrical degrees to the axis of the armature field (armature polarities N, S.) The effect of the outside circuit 0—23—24—13 or 0—23—13 is that the excitation component of the field winding 14 to 17 has become weakened and the speed of the motor correspondingly increased in a manner which will be more fully explained in connection with Fig. 5.

Referring now to the right hand movable controller contacts it will be seen that, when these contacts engage with the stationary contacts, the main current will enter the field winding at 16 (instead of 14) and will leave at 19 (instead of 17), causing the polarities N, S of the field magnet to shift in a similar manner. This will in turn cause a reversal in the direction of rotation as will be readily understood. It will be noticed from Fig. 1 that the main current field terminals are located at 45 electrical degrees to the axis of the armature field, the effect of which will be fully explained by the diagram shown in Fig. 3. It will also be noticed that the field winding has twice as many turns as the armature winding.

Referring now to Fig. 3, the sine curves $b$ and $d$ represent field (induction) diagrams, corresponding to the ampere turns upon the field and the armature windings as shown in Fig. 1. That is to say, the curve $b$ at 45 degrees represents the main field, whereas the dotted curve $d$ represents the armature-field, both curves being drawn to scale in order to be relatively correct. Now, these two curves may be added together in a well known manner, producing another sine curve $e$ which represents the resultant field; i. e., the distorted field resulting from the armature reaction. This curve is important as it shows at a glance the strength of the excitation field, as well as the relative strength of the commutation-field.

Fig. 2 illustrates another motor having the same armature as shown in Fig. 1 and a similar field magnet, the only difference being that the said field magnet is furnished with two distinct windings having terminals at 90 electrical degrees to one another. Each one of these windings is furnished with a definite number of turns as compared to the number of turns on the field winding shown in Fig. 1, the ratio being as 17 to 24 or = sinus 45°. The circuit connections in Fig. 2 are shown without a controller, the chief object being to explain the effect of the two field windings. It will be seen that the current enters the first field winding at terminal 35 and that it leaves at 36, which terminal is connected with another terminal 37 of the second field winding. Passing through the second field winding the current leaves the same at terminal 38, from which point it flows through the armature winding precisely as in Fig. 1 and as clearly shown on the drawing. It should be pointed out that the terminals of the first field winding are located at 90 electrical degrees to the axis of the armature field (this winding serving as a winding for excitation) and that the terminals for the second winding are opposite the brushes; that is to say, the second winding is connected in such a manner that it will oppose the armature-field.

Referring now to Fig. 4, the sine curves $g$ and $h$ illustrate respectively the field strengths due to the first and the second field winding, the two curves being drawn to the same scale as used in connection with Fig. 3. The curve $d$ (Fig. 4) illustrates, as in Fig. 3, the relative strength of the armature-field. The difference between the curves $h$ and $d$ will at once give the strength of the commutation-field which will be found to be precisely the same as in Fig. 3. The strength of the commutation-field can also be found by first adding the curves $g$ and $h$ together, producing the curve $b$ and second by adding curves $b$ and $d$ together, producing the final curve $e$ (same as in Fig. 3) which gives the resultant field including the armature reaction. It will now be understood that the single field winding shown in Fig. 1 is equivalent to an excitation winding 35—36 (Fig. 2) plus a second winding 37—38, which not only compensates for the armature reaction, but which also produces a strong commutating field. The advantage of the single winding shown in Fig. 1 becomes apparent from the fact that the ratio between the total amount of field turns in Figs. 1 and 2 is as 24 to 34; a decided reduction in copper, space occupied and insulating difficulties.

Referring now to Fig. 5, the two heavy circles represent the field and the armature windings shown in Fig. 1, the various field terminals being indicated by like numbers. It will be remembered that the field terminals 0 and 13 were arranged to become connected through the resistances 23 and 24 (see Fig. 1.) In Fig. 5 these same terminals are supposed to be short circuited by a connection 0—13 having practically no resistance as compared with the resistance of the field winding. Assuming now that a total current of say 40 amperes is flowing through the motor circuits, it will be understood that at terminal 14 this current will divide itself as follows:—In the circuit 14—0—13—17 there will be 30 amperes flowing and in the circuit 14—16—13—0—19—17 there will be 10 amperes flowing, because the ratio of the resistances in the two circuits is obviously as 1 to 3. It follows from this that the ampere turns upon the short portions 14—0 and 13—17 of the field winding are equal to the ampere turns upon the longer portions 14—16—13 and 0—19—17. The effect of this uneven distribution of ampere turns in the field winding is that the resultant field polarities (omitting the effect of the armature reaction) have become shifted as indicated in Fig. 5, until they nearly oppose the polarities of the armature (or the armature-field).

It will be understood from the above that when an outside circuit is established between the field terminals 0 and 13, not only does the excitation component become weakened, but the field polarities become shifted toward the armature polarities in a manner that will insure perfect commutation at weak field strengths. In the present case (see Fig. 5) assuming the field turns to be twice the number of armature turns and the main field terminals at 45°, the strength of the excitation field has actually been reduced to about one-third of the full field strength; that is to say, the speed of the motor (the total current being constant) has been increased about 300 percent.

The above described method of reducing the field strength; i. e. increasing the speed of the motor, has another advantage in that the main current cannot rush through a non-inductive path, as the current or the voltage is being changed, without affecting the field ampere turns. It is well known to those familiar with the art that it is objectionable in certain cases to reduce the field strength by shunting part of the field current through non-inductive resistances arranged in parallel with the field winding, the trouble being that at any sudden change in voltage the current will first rush through the non-inductive path.

Fig. 6 illustrates a different scheme for regulating the strength of the excitation field. A small motor-generator 39, 40 is in this case arranged to give to the field magnet a separate excitation in addition to the excitation from the main current. By this method a very wide speed range may be obtained and the apparatus will serve the dual purpose of either motor or generator, depending upon whether it is driving or being driven. By modifying the angle at which the main field terminals 14—17 and 16—19 are located and by modifying the number of turns in the field winding, it becomes possible to change the character of the field from a strong compound or differential to a plain shunt-field, the shunt characteristic being obtained (see Fig. 6) when the field terminals 14—17 and 16—19 are moved together opposite to the brushes.

The above described simple form of field winding is particularly applicable to railway motors or similar apparatus. It becomes possible by the use of the present invention to materially reduce the diameter and the weight of the yoke or the field magnet. The distributed field winding can be ventilated in a superior manner, the commutation will be perfect, the voltages used at the present time can be considerably increased and a most efficient and perfect method of field regulation (regulation of speed) is realized.

Having thus described my invention what I claim and desire to secure by Letters Patent of the United States is—

1. A dynamo electric machine or electric motor of the commutator type having a distributed field winding for excitation and for producing a commutation-field of predetermined strength, said field winding being substantially a counterpart of the armature winding; in combination with two sets of terminals for the said field winding connected to a switch or controller, said switch being provided with means for shifting the magnetizing effect of the said field winding from one side of the axis of the armature-field to the opposite side thereof, utilizing all of the coils of the said field winding, for the purpose of reversing the direction of rotation, substantially as described.

2. A dynamo electric machine or electric motor of the commutator type having a distributed field winding for excitation and for producing a commutation-field of predetermined strength; in combination with means for regulating the strength of the excitation component of the said field winding and additional means for shifting the magnetizing effect of the said field winding from one side of the axis of the armature-field to the opposite side thereof, for the purpose of reversing the direction of rotation, substantially as described.

3. In a dynamo electric machine or electric motor of the commutator type, a distributed field winding having its main field terminals arranged to produce field polarities at an angle of less than 90 electrical degrees to the axis of the armature-field; in combination with other auxiliary field terminals for the said field winding and means connected with said auxiliary terminals for regulating the strength of the excitation component of the said field winding, substantially as described.

4. In a dynamo electric machine or electric motor of the commutator type, a distributed field winding having its main terminals connected in series with the armature; in combination with other auxiliary field terminals for the said field winding electrically displaced from the first-mentioned terminals and connected with means for regulating the strength of the excitation component of the said field winding, substantially as described.

5. In a dynamo electric machine or electric motor of the commutator type, a distributed field winding having its main field terminals arranged to produce field polarities at an angle of less than 90 electrical degrees to the axis of the armature-field; in combination with other auxiliary field terminals for the said field winding connected with a speed regulating controller, said controller being provided with means for diverting part of the excitation current for the said field winding, substantially as described.

6. In a dynamo electric machine or electric motor of the commutator type, a distributed field winding having its main field terminals connected in series with the armature; in combination with other auxiliary field terminals for the said field winding electrically displaced from the first mentioned terminals, said auxiliary field terminals being connected with an independent source of current supply, substantially as described.

In testimony whereof I have signed my name to this specification in the presence of two subscribing witnesses.

ROBERT LUNDELL.

Witnesses:
C. J. KINTNER,
M. F. KEATING.